United States Patent
Willams

[11] 3,712,359
[45] Jan. 23, 1973

[54] CRAZY TIRES

[76] Inventor: Victor E. Willams, 3662 77th Place, Merrillville, Ind. 46410

[22] Filed: March 16, 1971

[21] Appl. No.: 124,817

[52] U.S. Cl. ................................ 152/352, 46/220
[51] Int. Cl. ................................ B60c 19/00
[58] Field of Search ........ 152/352, 209; 46/114, 220; 280/229, 1.1, 1.11

[56] References Cited

UNITED STATES PATENTS 3,194,583  7/1965  Nottage ........................... 280/229
2,651,880  9/1953  Kennedy .......................... 46/114
2,790,503  4/1957  Kopczynski ....................... 46/221

*Primary Examiner*—James B. Marbert
*Attorney*—Victor E. Williams

[57] ABSTRACT

An amusement tire for a vehicle so as to give a pleasure ride that is bumpy, the tire including an outer periphery that is not perfectly round but which is bump configurated in any of various designs such as being octagnonal, scalloped, toothed, or wherein the bumps of any shape are of various different heights on a single tire.

1 Claim, 7 Drawing Figures

PATENTED JAN 23 1973
3,712,359
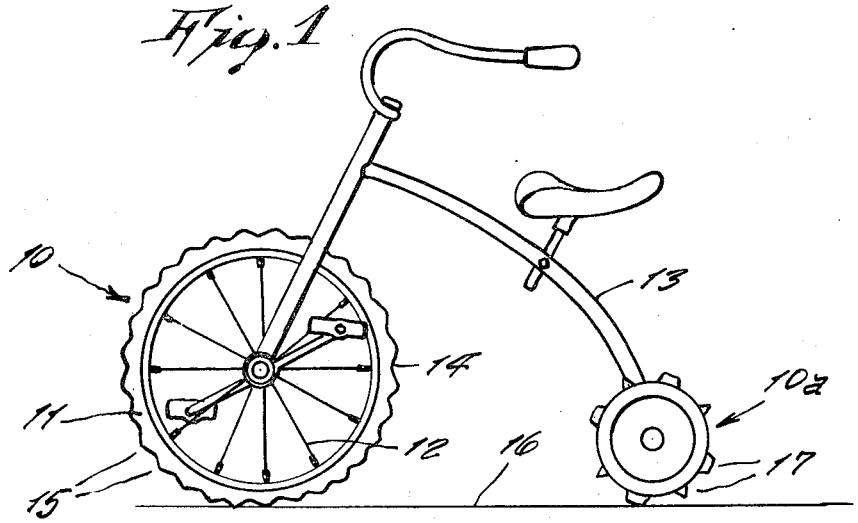
Fig.1
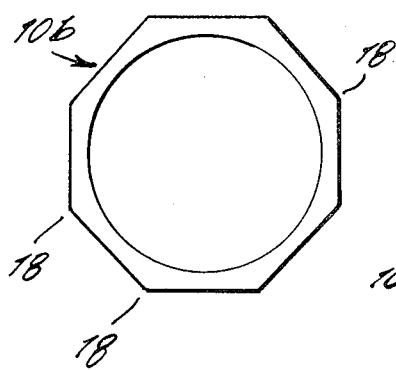
Fig.2
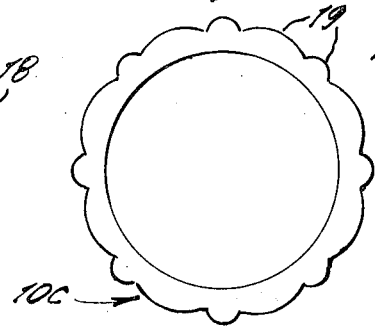
Fig.3
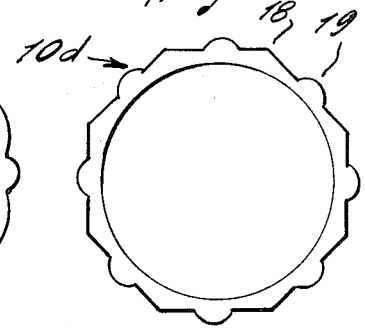
Fig.4
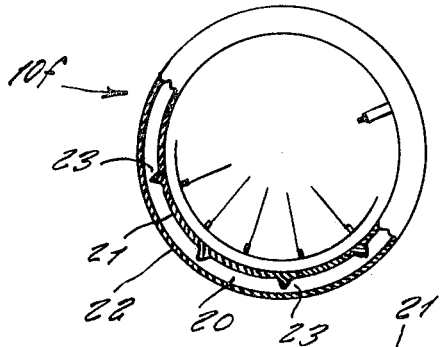
Fig.6
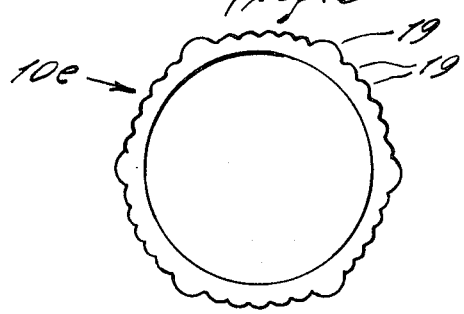
Fig.5
Fig.7
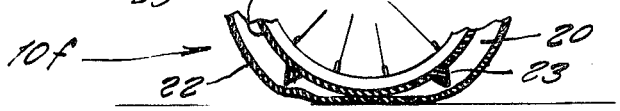
INVENTOR
VICTOR E. WILLIAMS

CRAZY TIRES

This invention relates generally to vehicle tires.

A principle object of the present invention is to provide a vehicle tire which on its outer periphery is bumpy rather than forming a true circle so that as the vehicle travels, a bumpy ride is given to the rider.

Another object is to provide a crazy tire which accordingly gives amusement and pleasure to a rider.

Yet another object is to provide a crazy tire wherein the tire outer periphery may be of any irregular shape such as toothed, scalloped, and the like and wherein the bumps may all be of a same or different size.

Yet a further object is to provide a crazy tire wherein the tire is adjustable so to give either a bumpy ride or a smooth ride.

Yet a further object is to provide a crazy tire which is suitable for use on any amusement vehicle for adults or children and which accordingly could be used in a carnival or amusement park vehicle or on children's tricycle or wagon.

Other objects are to provide a CRAZY TIRE which is simple in design, inexpensive to manufacture, rugged in construction, easy to use and efficient in operation.

These and other objects will be readily evident upon a study of the following specification and the accompanying drawing, wherein:

FIG. 1 is a side view of a tricycle employing the present invention.

FIGS. 2 through 5 are side elevation views of modified designs of the present invention.

FIG. 6 is a side view shown partly in cross section and illustrating another modified design of the invention wherein a crazy tire selectively adjusted to give a smooth ride.

FIG. 7 is a similar view thereof shown adjusted to give a bumpy ride.

Referring now to the drawing in detail, and more particularly to FIG. 1 at this time, the reference numeral 10 represents a CRAZY TIRE according to the present invention wherein there is a tire member 11 mounted on a wheel 12 of a child's tricycle 13 or other vehicle; the tire having an outer periphery 14 that is configurated with a plurality of projecting bumps 15.

In operative use, it is now evident that when the tire 10 travels over a smooth surface 16, the tire will nevertheless produce a bumpy ride to a rider.

In the same FIG., the rear wheels 10a likewise incorporate the principles of the present invention, but wherein the bumps 15 are differently configurated to form projecting teeth 17.

In FIG. 2, the tire 10b is of octagonal shape with projecting corners 18 on the outer periphery.

In FIG. 3, 4 and 5, the tires 10c, 10d and 10e each have peripheral scallops 19 of different patterns and wherein the scallops are of different sizes on the same tire.

In FIGS. 6 and 7 the tire 10f is tubular having a central air space 20 between inner peripheral wall 21 and outer peripheral wall 22. The inner wall 21 has integral teeth 23 projecting into the space 20. When the tire is fully inflated as shown in FIG. 6, the teeth do not contact the outer wall 22 so that a smooth ride results. However, when a bumpy ride is desired, the tire is deflated so that the teeth touch the outer wall 22 at the ground area, as shown in FIG. 7.

Thus an amusement ride is provided by crazy tires.

While various changes may be made in the detail construction, it is to be understood that such changes will be within the spirit and scope of the present invention, as is defined in the appended claims.

I claim:

1. In a crazy tire for a vehicle to provide an amusement ride, the combination of a tire member mounted on a wheel, said tire member including an outer periphery and means to produce a bumpy ride, wherein said means comprises said tire being pneumatic and having a central air space between an inner peripheral wall, said inner wall having a series of integral projections, projecting into said space, said projections not contacting said outer wall when said tire is fully inflated but which contact said outer wall when said tire is deflated.

* * * * *